United States Patent [19]

Tschirner

[11] Patent Number: 4,719,706
[45] Date of Patent: Jan. 19, 1988

[54] APPARATUS FOR CHANGING THE MOISTURE CONTENT OF RUNNING WEBS OF TEXTILE MATERIAL OR THE LIKE

[75] Inventor: Wolfgang Tschirner, Tönisvorst, Fed. Rep. of Germany

[73] Assignee: Kleinewefers Textilmaschinen GmbH, Krefeld, Fed. Rep. of Germany

[21] Appl. No.: 855,881

[22] Filed: Apr. 24, 1986

[30] Foreign Application Priority Data

Apr. 27, 1985 [DE] Fed. Rep. of Germany ........ 3515265

[51] Int. Cl.⁴ ............................................. F26B 13/26
[52] U.S. Cl. ........................................... 34/71; 34/95; 29/148.4 D
[58] Field of Search ............................. 34/71, 89.1, 95; 29/123, 130, 132, 148.4 D

[56] References Cited

U.S. PATENT DOCUMENTS

| 1,436,956 | 11/1922 | Guay | 29/148.4 D |
| 2,720,692 | 10/1955 | Lorig | 29/148.4 D |
| 2,801,461 | 8/1957 | Kusters | 29/148.4 D |
| 3,054,163 | 9/1962 | Lakin | 29/123 |
| 3,296,710 | 1/1967 | Krikorian | 34/95 |

FOREIGN PATENT DOCUMENTS

| 498397 | 5/1930 | Fed. Rep. of Germany . |
| 2438337 | 2/1976 | Fed. Rep. of Germany . |
| 3,108,747 | 9/1982 | Fed. Rep. of Germany . |
| 709908 | 6/1954 | United Kingdom . |
| 725762 | 3/1955 | United Kingdom . |

Primary Examiner—Albert J. Makay
Assistant Examiner—David W. Westphal
Attorney, Agent, or Firm—Peter K. Kontler

[57] ABSTRACT

Apparatus for expelling and/or withdrawing moisture from, or for admitting moisture to, a running web of paper or textile material has rolls which define one or more nips for the running web and at least one of which has a stack of washer-like funnel-shaped absorbent discs compressed between two end walls one of which has an outwardly bulging frustoconical surface and the other of which has an inwardly bulging frustoconical surface. The discs surround a core of stainless steel and their density in the region of the core is highest due to the provision of funnel-shaped elastomeric inserts which surround the core and whose thickness decreases in a direction from the core toward the external surface of the roll. Such roll renders it possible to operate with a stack of discs whose hardness at the periphery of the roll is relatively low in spite of a substantial nip pressure, or to operate with a very pronounced nip pressure at a given hardness in the region of the peripheral surface. In either event, the discs exhibit a satisfactory deformability at the nip as well as the ability to reestablish the cylindrical shape of the periphery of the roll immediately downstream of the nip.

29 Claims, 3 Drawing Figures

APPARATUS FOR CHANGING THE MOISTURE CONTENT OF RUNNING WEBS OF TEXTILE MATERIAL OR THE LIKE

BACKGROUND OF THE INVENTION

The invention relates to apparatus for treating running webs of paper, textile material or the like, and more particularly to improvements in rolls which can be used in calenders and other types of machines and have external surfaces defined by stacks of absorbent discs.

It is known to assemble washer-like absorbent discs into a stack and to mount such discs on a core to form a roll which can be used with one or more additional rolls to define one or more nips for the passage of a running web of a material which contains a surplus of moisture or whose moisture content is to be increased. Reference may be had, for example, to German Pat. No. 498,397, to German Offenlegungsschrift No. 31 08 747 or to British Pat. No. 725,762.

FIG. 1 of German Pat. No. 498,397 shows a roll wherein one of the end walls has a frustoconical surface which abuts the adjacent absorbent disc of the stack on the core and converts the neighboring discs into funnel-shaped bodies each of which has an inner and an outer frustoconical surface. The conicity of the surface on the end wall is approximately 160 degrees. The discs which are disposed substantially midway between the end walls are flat, and the conicity of the discs in the stack increases in a direction from the center toward the end wall which is shown in FIG. 1 of the patent. The density of discs in the regions immediately adjacent to the periphery of the core exceeds the density of such discs in the region of the external surface of the roll. This is desirable in order to ensure that the density of the stack of discs does not decrease due to a reduction of internal stresses as a result of prolonged use of the roll and after repeated grinding to refinish the external surface.

The roll which is disclosed in the German Offenlegungsschrift No. 31 08 747 comprises two flat end walls which flank a stack of large concentric discs alternating with smaller concentric discs. The larger-diameter discs are made of an absorbent fibrous material and are flat, i.e., their planes are normal to the axis of the core. The smaller-diameter discs ensure that the density of the composite stack of smaller- and larger-diameter discs between the two end walls is greater in the region around the periphery of the core. The roll which is disclosed in this publication serves to withdraw moisture, and the density of its larger-diameter discs at the periphery of the composite stack of discs is less than in a calender roll, namely only between 80° and 95° Shore A.

All of the known rolls exhibit the drawback that they undergo extensive and unpredictable deformation in response to the application of pressures which develop in the nip during passage of a web of textile material or the like. If the pressure (with reference to the hardness of the radially outermost portion of the roll) is sufficiently small, the roll undergoes a mere elastic deformation and is capable of restoring its cylindrical shape immediately downstream of the nip. However, if the pressure in the nip is rather pronounced (this is desirable in connection with the treatment of many types of web-like and other materials), the fulling action upon the roll in the region of the nip entails a densification of the discs with attendant increase of hardness of the roll in the region of its peripheral surface. As a rule, the nip pressure should not exceed 50 daNcm when the hardness of the radially outermost portions of the discs is about 90° Shore A. However, if the hardness is about 80° Shore A and the nip pressure remains in the range of 50 daN/cm, the hardness automatically increases, at an unpredictable rate, to about 90° Shore A after the roll completes a relatively small number of revolutions (in the range of one or more thousand revolutions). The peripheral surface of the thus hardened stack of discs exhibits an undulate shape and develops cracks so that it cannot subject a running web to a predictable moisturizing, demoisturizing or other action. The only remedy is to grind the roll so as to reestablish a cylindrical external surface.

OBJECTS AND SUMMARY OF THE INVENTION

An object of the invention is to provide an apparatus which employs one or more rolls with stacks of absorbent discs which are capable of treating webs of paper or the like at a higher nip pressure for a given hardness of their peripheral surfaces than heretofore or at a standard nip pressure for a relatively soft peripheral surface.

Another object of the invention is to provide a roll with discs whose useful life is longer than that of the discs in conventional rolls.

A further object of the invention is to provide a novel and improved apparatus which employs one or more rolls exhibiting the above outlined features.

An additional object of the invention is to provide a novel and improved method of distributing compressive and flexural stresses upon absorbent discs in the roll of a calender or a like machine.

Still another object of the invention is to provide a roll wherein the discs can expel moisture from a running web of textile material or the like in a novel and improved way.

A further object of the invention is to provide novel and improved means for maintaining a stack of discs on a cylindrical core under requisite compression for extended periods of time and while the discs are subjected to pronounced deforming stresses.

Another object of the invention is to provide a roll which can be used as a superior substitute for existing rolls in apparatus for changing the moisture content of running paper webs or the like.

A further object of the invention is to provide a roll which need not be reground and/or otherwise treated at frequent intervals and which does not always require a grinding and polishing treatment prior to the first use.

The invention resides in the provision of an apparatus for changing the moisture content of a running web of filamentary, fibrous or like material (e.g., a running web of textile material or a running web of paper in a calender). The apparatus comprises at least one roll having a core and a shell which surrounds the core and has a cylindrical external surface. The shell is composed of a stack of washer-like concentric discs which are made of or contain an absorbent material, and the one roll further comprises two end walls which flank the shell and maintain the discs in compressed condition. One of the end walls has a convex (i.e., an outwardly bulging) frustoconical surface which abuts the respective end of the stack of discs, and the other end wall has a concave (i.e., inwardly bulging) frustoconical surface which abuts the respective end of the stack. This ensures that each disc has a frustoconical shape, i.e., all the way from one of the end walls to the other end wall.

The roll preferably further comprises at least one substantially funnel-shaped washer or insert which is interposed between two discs of the stack and whose outer diameter is smaller than the diameter of the external surface of the shell. In accordance with a presently preferred embodiment of the invention, the thickness of the washer (which can be made of or can contain an elastomeric material) decreases in a direction from the core toward the external surface of the shell (the thickness of the washer is measured in the axial direction of the core and of the shell thereon).

At least one of the two frustoconical surfaces is preferably roughened, e.g., serrated. The arrangement may be such that the convex frustoconical surface has at least one first one-piece or composite ring-shaped tooth having a first annular flank which is nearer to the core and a second annular flank which is more distant from the core. The two flanks define an edge at that end of the first flank which is nearer to the core. The concave frustoconical surface can be provided with at least one one-piece or composite annular tooth having a first flank nearer to the core and a second flank more distant from the core. These flanks define an annular edge at that end of the first flank which is more distant from the core.

The frustoconical surfaces make with the axis of the core an oblique angle, preferably in the range of between 90+ and 176 degrees.

If the core and the radially innermost portions of the discs which form the stack define one or more clearances or gaps, such clearance or clearances are preferably filled with a filler of a suitable synthetic plastic material e.g., a synthetic resin.

The outer layer of the core, or the entire core, can be made of stainless steel or from another suitable corrosion-resistant material.

For certain uses, the hardness of the shell in the region of its external surface is preferably less than 80° Shore A, most preferably between 40° and 70° Shore A. The density of the discs in the region of the core is preferably between 1.1 and 2 times the density of such discs in the region of the external surface of the shell. The arrangement may be such that the density of the discs in the region of the external surface of the shell is less than 1 g/cm$^3$, preferably between 0.3 and 0.6 g/cm$^3$.

One of the end walls can be fixed to the core, and the other end wall can be biased against the one end wall by a package of dished springs or the like.

The apparatus further comprises a second roll defining with the one roll a nip through which the running web passes and wherein the pressure during passage of the web at least approximates a preselected value at which the density of the discs forming the shell of the one roll in the region of the external surface of such shell increases to a given value equaling or approximating the density of discs in the region of the respective core. The absorbency of the discs is or can be selected in such a way that, when a disc is not deformed, it is capable of absorbing a large quantity of a liquid medium, e.g., a quantity whose weight is at least twenty times the weight of the respective disc. Each disc can be made of a fibrous material.

A roller, a pulley or another suitable web tensioning means can be provided to deflect the web and to maintain the deflected web in contact with the external surface of the shell along an arc of at least 60° downstream of the nip.

The second roll can comprise a second shell having a cylindrical external surface and also comprising a stack of washer-like absorbent funnel-shaped discs each of which has two rather pronounced furstoconical sides or surfaces. The density of discs forming the stack of the second shell in the region of the external surface of the second shell can be less than the density of discs in the one roll (if the running web is draped around a portion of the one roll, e.g., by the aforementioned tensioning means). The inclination of discs in the one roll relative to the axis of the respective core is or can be substantially identical with the inclination of discs in the second roll with reference to the axis of the respective core. Alternatively, the inclination of discs in the one roll can be just the opposite of inclination of the discs in the second roll.

The diameter of the external surface of the shell in one of the rolls can approximate the diameter of the core in the other shell; this renders it possible to convert circular plate-like blanks into pairs of discs one of which forms part of the shell in one of the rolls and the other of which forms part of the shell of the other roll.

Supporting means can be provided to cooperate with the second roll so as to support the one roll in a position in which the one roll floats between the supporting means and the second roll and the external surface of its shell defines with the external surface of the second roll a nip for the running web of paper, textile material or the like. The supporting means can comprise a third roll whose construction may but need not be similar to that of the one roll and/or the second roll.

If the diameter of one of the rolls is greater than the diameter of the other roll, the diameter of the external surface of the larger-diameter roll can exceed the diameter of the respective core by up to 1.4 times the diameter of the core, and the diameter of the other roll can be more than 1.4 times the diameter of the respective core.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
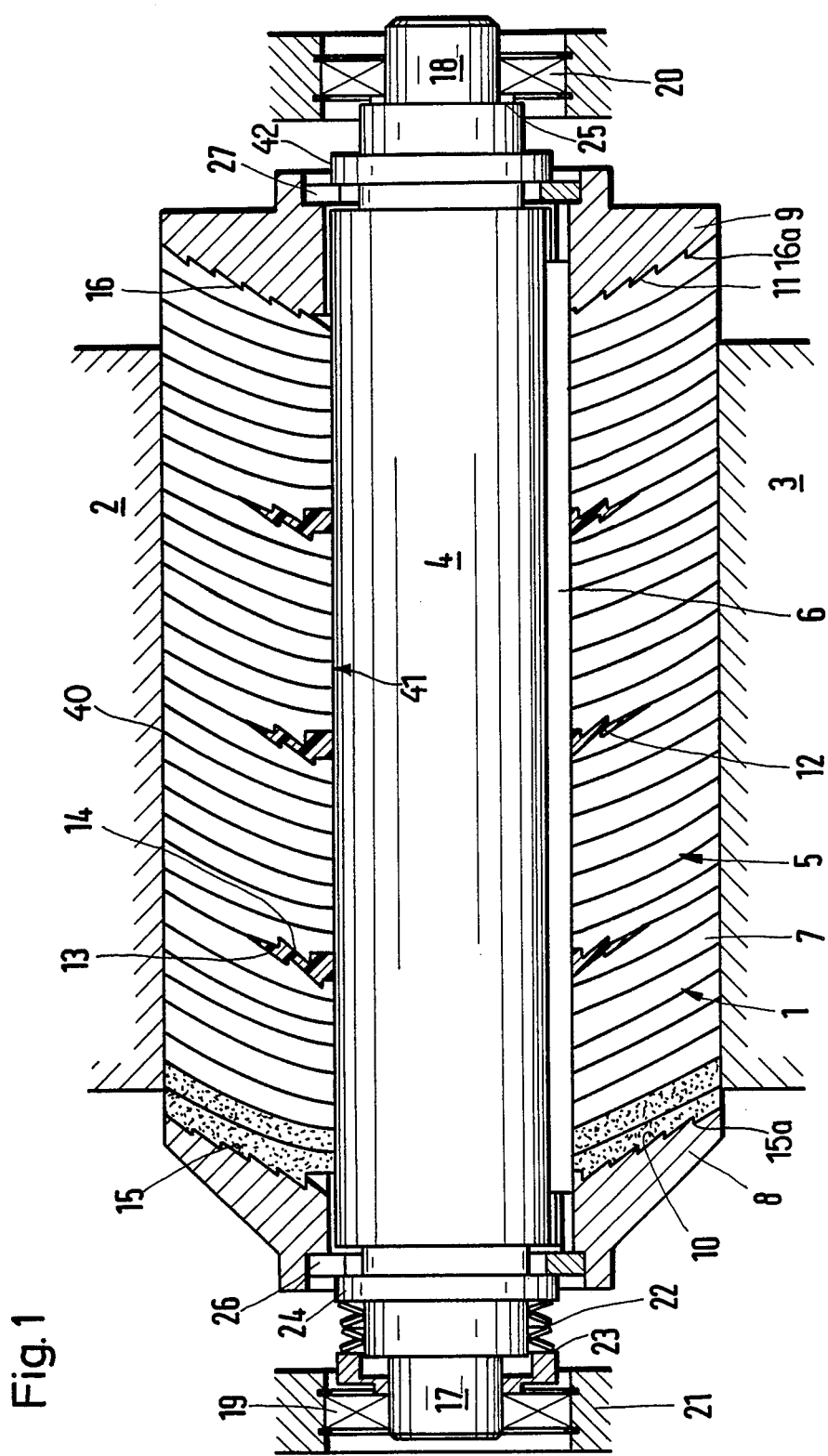
FIG. 1 is an axial sectional view of a roll in the apparatus of the present invention.

FIG. 1 shows a roll 1 which forms part of a calender and is mounted between an upper roll 2 and a support 3. The roll 1 comprises an elongated core 4 and a hollow cylindrical shell 5 which includes a stack of concentric absorbent discs 7. The core 4 has an axially parallel flute for a key 6 which holds the shell 5 and the core against rotation about their common axis. The core 4 can be made of stainless steel or from an equivalent corrosion-resistant material. It is often sufficient to provide a relatively inexpensive core with an outer layer of stainless steel to thus reduce the overall cost of the calender.

Each disc 7 is actually a washer having a centrally located hole and resembling a funnel. The discs 7 can be made of a non-woven textile material containing cellulose, cotton, a mixture of cellulose and cotton, wool, one or more synthetic materials such as polyamides, acrylics and their mixtures as well as many other materials which can absorb large quantities of moisture. If the primary purpose of the shell 5 is to absorb moisture from a running web 34 (see FIG. 2) of paper, textile material or the like, the material of the discs 7 preferably exhibits a sponge-like consistency so that it can absorb moisture in quantities of up to twenty and in excess of twenty times its own weight (the discs exhibit such absorbency in non-compressed condition of their material).

The roll 1 further comprises two end walls 8 and 9 which flank the stack of discs 7 (i.e., which are disposed at the opposite axial ends of the shell 5) and have frustoconical shell-engaging surfaces 10 and 11, respectively. The surface 10 is concave (i.e., it bulges inwardly) and the surface 11 is convex because it bulges outwardly (toward the surface 10).

In accordance with a feature of the invention, the roll 1 further comprises one or more substantially washer-like inserts 12 which are interposed between pairs of neighboring discs 7 and each of which has an outer diameter smaller than the diameter of the cylindrical external surface 40 of the shell 5. The thickness of each insert 12 (as measured axially of the core 4) decreases in a direction from the periphery of the core 4 toward the external surface 40. The purpose of the washer-like inserts 12 is to ensure that the radially innermost portions of the discs 7 are subjected to more pronounced compressing forces (acting in the axial direction of the core) than the radially outermost portions of the discs in the region of the external surface 40. Each of the inserts 12 has a convex frustoconical surface 13 and a concave frustoconical surface 14; the inclination of the surfaces 13, 14 may but need not match the inclination of the surfaces 11, 10.

In order to further reduce the likelihood of rotation of the discs 7 relative to each other and/or the likelihood of rotation and/or other stray movements of the shell 5 relative to the core 4 and end walls 8, 9, the surfaces 10, 11, 13 and 14 are roughened, preferably serrated, so as to increase the area of contact with the respective discs 7. The illustrated surfaces 10, 11, 13 and 14 have a substantially sawtooth-shaped profile. The arrangement is such that each annular tooth 16 of the convex frustoconical surface 11 has a longer ring-shaped first flank which is more distant from the axis of the core 4 and a shorter ring-shaped second flank which is nearer to the core. The two flanks define an annular edge 16a which is disposed at the radially innermost end of the respective first flank. The configuration and orientation of teeth on the surface 14 of each insert 12 is similar. Each tooth 15 on the concave frustoconical surface 10 of the end wall 8 has a larger annular flank and a smaller annular flank which is more distant from the core 4. The two flanks define an annular edge 15a at the radially outermost end of the larger flank. The orientation of teeth on the surface 14 of each insert 12 is similar. Such orientation of teeth 15, 16 and of teeth on the surfaces 13, 14 of the inserts 12 has been found to be particularly effective to ensure the establishment of a pronounced frictional engagement with the adjacent discs 7.

The end portions 17, 18 of the core 4 constitute two stubs which are repsectively rotatable in antifriction bearings 19 and 20. These bearings are installed in the housing or frame 21 of the calender. The end wall 8 is biased axially of the core 4 toward the end wall 9 by a package of dished springs 22 which surround the stub 17 and react against a ring 23 abutting one race of the antifriction bearing 19. The springs 22 bear against a ring 24 which, in turn, bears against a split ring 26 in an internal groove of the end wall 8. The ring 24 can constitute an integral part (i.e., a collar) of the core 4. A right-hand collar 42 of the core 4 is in contact with a split ring 27 which is installed in an internal groove of the end wall 9. The core 4 can be shifted axially and in a direction to the left (as viewed in FIG. 1) against the opposition of the springs 22.

Figures 2, 3:
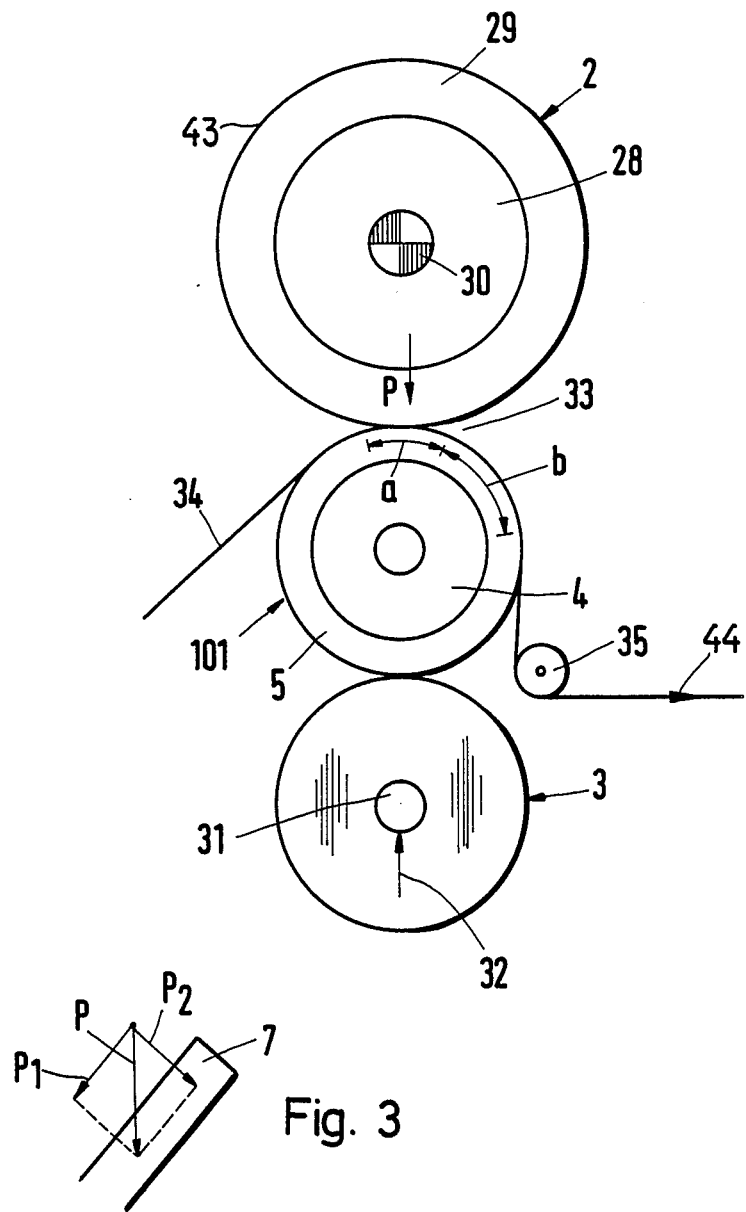
FIG. 2 is a smaller-scale end elevational view of an apparatus which employs a set of three rolls at least two of which are constructed and assembled in accordance with the invention.
FIG. 3 is a diagram of forces acting upon a running web between the upper two rolls of the apparatus of FIG. 2.

The roll 101 of FIG. 2 is similar to the roll 1 of FIG. 1 except that its core 4 is not mounted for rotation about a fixed axis; instead, the roll 101 floats between the upper roll 2 and the support 3 which can constitute a third roll. The roll 2 can be identical with the roll 1 of FIG. 1; FIG. 2 merely shows its shell 29, its core 28 and one of the stubs 30. The shell 29 comprises a stack of funnel-shaped absorbent discs and the stub 30 is driven so that the cylindrical external surface 43 of the shell 29 causes the web 34 to advance in the direction of the arrow 44.

The outer diameter of the shell 5 in the roll 101 equals or approximates the diameter of the core 28. This is desirable and advantageous because each disc of the shell 29 can be made from a circular plate-like blank which further yields a disc for the shell 5. The conversion of a blank into two discs (one for the shell 29 and the other of the shell 5 of FIG. 2) is preferably performed in a suitable stamping machine.

The support 3 can constitute a metallic roll having a shaft 31, or it can constitute a roll which is similar to or identical with the roll 1 or 101. Its function is to urge the roll 101 upwardly (note the arrow 32) against the roll 2 so that the web 34 is subjected to a requisite pressure (note the nip force P) during travel through the nip 33 of the rolls 2, 101. FIG. 2 further shows a tensioning roller or pulley 35 which is mounted in the machine frame downstream of the nip 33 and ensures that the web 34 is draped around the external surface of the shell 5 along an arc of at least 60°, e.g., along an arc somewhat in excess of 90°. This ensures that the web 34 cannot slip relative to the external surfaces of the rolls 2 and 101. Such mounting of the rolls 2, 3, 101 and such positioning of the tensioning roller 35 is desirable and advantageous when the web 34 is a sheet of textile material which is to be treated for the purpose of reducing its moisture content. The web 34 is squeezed along an arc a with attendant deformation of the adjacent portion of the external surface of the shell 5. The discs of the shell 5 thereupon rebound along the arc b so that the corresponding portion of the external surface of the shell 5 reassumes a truly cylindrical shape. Thus, the sizes of pores in the discs of the shell 5 are reduced during travel along the arc a and the sizes of such pores increase during travel along the arc b to reassume their normal dimensions during travel from the three o'clock position toward the ten or eleven o'clock position of FIG. 2. Expansion of discs which form the shell 5 during travel along the arc b produces suction with attendant evacuation of additional moisture from the adjacent increments of the running web 34, i.e., some moisture is expelled by squeezing the web 34 along the arc a and additional moisture is expelled (withdrawn) from the web by suction during travel along the arc b.

The distribution and orientation of forces acting upon the web 34 in the nip 33 is shown in the diagram of FIG. 3. The nip force P has a first component $P_1$ which is substantially parallel to the illustrated disc 7 of the shell 5, and a second component $P_2$ which is substantially normal to the plane of the disc 7. The component $P_1$ contributes little to deformation of the disc 7 in the nip 33 because the extent to which a disc 7 can be deformed radially of the core 4 is relatively small. The component $P_2$ effects an additional densification of the disc 7 in the region of the nip 33. Thus, the thickness of the disc 7 (as measured in the axial direction of the core 4) decreases in the region of the nip 33 with attendant small reduction of the radius of the shell 5 immediately adjacent the roll 2. Such reduction of the radius is eliminated when the respective portion of the disc 7 reaches the arc b due to innate elasticity of the material of the disc. With reference to FIG. 1, the radially outermost portion of that part of a disc 7 which is immediately adjacent to the roll 2 will be flexed to the right (under the action of the component $P_2$ of the force P). Such rightward movement of topmost portions of the discs 7 is compensated for by axial shifting of the entire shell 5 against the opposition of the springs 22.

The densifying action of inserts 12 is preferably selected in such a way that the density of the radially outermost portions of the discs 7 is still high enough to allow for the application of requisite nip force P. It has been found that the distribution of densities in the discs 7 is quite satisfactory (and perhaps optimal) if the densification of the radially outermost portions of the discs at the nip 33 in response to the application of a maximum nip force P matches the density of discs in the region of the core, i.e., at the levels of the inserts 12. With the above in mind, the magnitude of the force P can be selected with a view to allow for appropriate densification of the discs in the region of the nip as well as for rapid and complete recovery of the discs (reestablishment of the truly circular cylindrical shape of the external surface of the shell) as soon as a portion of a disc advances from the region of the arc a to the region of the arc b shown in FIG. 2.

A novel roll was put to use under the following circumstances: The roll was used to withdraw and/or expel water from a running web of textile material, and the hardness of the roll at the periphery of the shell was less than 60° Shore A. Nevertheless, it was possible to establish and maintain a nip pressure of more than 50 daN/cm. The density of the shell in the region of the periphery of the core was approximately 90° Shore A.

When the novel roll was used in a calender, the hardness of the shell at its external surface was well in excess of 45° Shore D (i.e., well in excess of 90° Shore A). The nip pressure was approximately 100 daN/cm. The shell exhibited a highly satisfactory deformability as well as a sufficient elasticity to reassume the optimum shape immediately downstream of the nip.

The improved roll and an apparatus employing such roll (or two or more such rolls) can be used with advantage to admit moisture to, or to withdraw and/or expel moisture from, webs which consist of paper, a textile material or a wide variety of additional materials. The improved roll can also be used in a machine for polishing plate glass or for applying a film of oil to metallic sheet stock in a production line. Sensitive webs can be placed between pairs of protective felt layers during travel through the nip of two rolls at least one of which is constructed and assembled in accordance with the invention.

An advantage of the improved roll is that the configuration of all or practically all discs 7 is the same all the way from the one end wall to the other end wall. When the shell 5 is subjected to radial compressive stresses, the developing forces have components acting at right angles to the planes of the adjacent portions of the discs (at the nip 33) so that the discs undergo a short-lasting additional densification with attendant deformation. The densification of the material of the discs is within the elastic range so that those portions of the discs 7 which advance beyond the nip 33 are free to expand and to reassume their original shape, i.e., the corresponding portion of the external surface 40 is again part of a cylinder with the radius on the axis of the core 4. This is in contrast to rolls having discs which are disposed in planes extending at right angles to the axis of the core (as in the aforediscussed German Pat. No. 498,397 and in the German Offenlegungsschrift No. 31 08 747). A disc whose plane is normal to the axis of the core is urged to remain in such plane because it is flanked by similarly configurated discs which prevent it from flexing. The resulting unpredictable deformation of such discs leads to the development of fissures in the peripheral surface of a conventional roll and to unsatisfactory treatment of goods which are caused to pass through the nip.

It has been found that the elasticity of a shell which is confined between two end walls in a manner as shown in FIG. 1 remains satisfactory for extended periods of time and the external surface 40 does not develop fissures, even in response to repeated drying. In fact, it is not even always necessary to grind and polish and/or similarly treat the external surface 40 before the roll is put to use. This means that the dipping into and swelling in hot water (which precedes the grinding operation) can be dispensed with. The discs can constitute standard hollow cones (without inwardly and outwardly bulging frustoconical surfaces) or they can constitute hollow cones of the type shown in FIG. 1, i.e., with an inwardly bulging and an outwardly bulging frustoconical surface.

The inserts or washers 12 constitute a desirable feature of the improved roll because they ensure that the discs 7 exhibit a frustoconical shape all the way from the end wall 8 to the end wall 9. Moreover, the inserts 12 ensure that the density of the stack 5 in the region which is adjacent to the core is greater than in the region of the external surface 40. Still further, the inserts 12 enable the manufacturer of the roll to select an optimum distribution of density all the way from the core to the external surface of the roll. This can be readily achieved by properly selecting the rate at which the thickness of the inserts 12 decreases in a direction from the core 4 to the external surface 40 as well as by properly selecting the outer diameters of the inserts. As a rule, or in many instances, the dimensions and the configuration of the inserts 12 will be selected with a view to ensure a gradual increase of density from the periphery of the core 4 toward the surface 40 of the shell 5. The making of one or more inserts 12 from an elastomeric material further contributes to a uniform increase of density radially outwardly from the core. An advantage of inserts whose outer diameters are smaller than the outer diameters of the discs 7 and which consist of an elastomeric material is that the grinding and/or other tools which are used from time to time to refinish the external surface 40 of the shell 5 are less likely to be dulled and/or otherwise damaged.

The teeth 15, 16 on the surfaces 10, 11 of the end walls 8 and 9 constitute but one form of serrations which can be utilized with advantage in the improved roll to prevent rotation of the discs 7 relative to the serrated surfaces and/or to prevent undesirable mirgration of the material of outermost discs and/or of the discs which flank the inserts 12 radially of and away from the axis of the core 4. The likelihood of radially outward migration of the material of the discs 7 is particularly pronounced during axial movement of the end wall 8 toward the end wall 9. Furthermore, the innermost portions of the discs 7 are kept close to the periphery of the core 4.

As mentioned above, the conicity of the surfaces 10, 11, 13 and 14 can be between 90+ and 176°. If the conicity is increased (i.e., if the aforementioned angle is smaller), the axial component $P_2$ of the nip force P will effect a more pronounced densification and deformation of the discs 7 at the nip 33 without affecting the ability of the funnel-shaped discs to reassume their normal shape.

Synthetic resins which can be used to fill the gaps 41 between the radially innermost portions of the discs 7 and the core 4 are disclosed in German Offenlegungsschrift No. 24 38 337.

The utilization of a core which consists of a corrosion-resistant material or which comprises an outer layer of such material is particularly desirable and advantageous if the roll is used for the expulsion of moisture from, or for admission of moisture to, running webs of textile material or the like. In addition to stainless steel, the outer layer of the core can consist of or contain hard rubber, an epoxy resin or an equivalent non-metallic material.

The utilization of a roll with relatively soft discs (with a hardness not in excess of 90° Shore A) is desirable and advantageous when the roll serves to expel water or another liquid from sheets or webs of paper, textile material or the like. As a rule, the hardness of such a roll at the periphery of its shell should be less than 80° Shore A and preferably between 40° and 70° Shore A. A roll whose shell exhibits such density and contains discs made of a fibrous material can absorb large quantities of moisture. Moreover, such a roll can stand pronounced nip pressures which are desirable in order to ensure that the rolls flanking the nip will expel from (squeeze out of) the running web a high percentage of moisture. The establishment of a density at the periphery of the core which is between 1.2 and 2 times the density at the external surface 40 is desirable and advantageous because the radially inner portion of each disc 7 constitutes a reliable support for the more readily flexible radially outer portion which is acted upon by the component $P_2$ of the nip force P when the discs are used to squeeze and suck moisture out of a running web of paper or the like. As explained above, the component $P_2$ effects a densification and hardening of successive increments of the discs 7 during travel along the arc a and they allow for rapid restoration of the original shape of such increments as soon as they reach the arc b downstream of the nip 33. The aforementioned optimum or presently preferred selection of densities in different portions of the discs (so that the compression in the region of the core is close to or equals the compression at the nip 33 in response to the application of maximum force P) ensures a most satisfactory utilization of the fibrous material of the discs 7 for the purposes of treating the running web. The feature that the discs 7 (in undeformed condition) can absorb large quantities of moisture (whose weight is up to and more than twenty times the weight of a dry disc) has been found to ensure a highly satisfactory absorption of moisture when the discs 7 are compressed by the end walls 8 and 9 which is desirable not only when the roll serves to expel and withdraw moisture but also when the roll constitutes a means for increasing the moisture content of a running web.

It is often sufficient if the compression of discs 7 is selected in such a way that the density of a disc does not exceed 1.0 g/cm$^3$ and is preferably between 0.3 and 0.6 g/cm$^3$. This ensures that the hardness at the periphery of the shell is relatively low but the roll operates quite satisfactorily because the density at the periphery of the core is higher and due to the provision of funnel-shaped discs. Rolls whose shells exhibit such densities are particularly suitable for changing (increasing or reducing) the moisture content of running webs.

The advantages of draping the running web around the external surface of the shell along an arc of at least 60 degrees have been pointed out above. Combined with a proper selection of conicity of the discs and with a proper selection of densities in different regions of the shell, such feature enables the roll to squeeze out moisture in the nip 33 (arc a) and to thereupon absorb substantial additional quantities of moisture along the arc b of FIG. 2. The feature of forming the nip by two rolls each having a shell which is assembled of discs in a manner as shown in FIG. 1 exhibits the advantage that the discs of both shells can undergo pronounced elastic deformation at the nip 33, i.e., the web portion in the nip is contacted by two flattened shell portions which contributes significantly to a satisfactory squeezing action upon the sheet or web stock. The expelled liquid can escape by flowing downstream as well as upstream of the nip.

The deforming action upon the shells of two neighboring rolls which embody the features of the roll 1 of FIG. 1 is particularly pronounced if the discs in the shell at one side of the nip slope in the same direction as the discs at the other side of the nip. This means that, when acted upon by the nip force P, the adjacent portions of discs in both shells move axially of the respective cores in the same direction (to the right, as viewed in FIG. 1). Consequently, the material of the web is treated gently.

If the inclination of discs in one of the shells is counter to the inclination of discs in the other shell, the disc portions at one side of the nip are shifted axially in a first direction and the disc portions at the other side of the nip are shifted axially in the opposite direction. Such orientation of discs in two neighboring shells ensures that the web can pass through the nip without any, or with negligible, lateral shifting.

Additional desirable and advantageous effects can be achieved by appropriate selection of the ratio of densities of discs in one of the shells with reference to the densities of discs in the other shell. Referring to FIG. 2, the density of the shell 5 is preferably less than the density of the shell 29, i.e., the density is lower in that shell around which the running web is draped by the tensioning roller 35. The shell 5 undergoes greater deformation and is capable of sucking large quantities of liquid from the web portion which extends along the arc b.

The making of discs of the shells 5 and 29 from plate-like blanks in a simultaneous operation entails substantial savings in fibrous material of the discs because the percentage of waste (remnants of the blanks) is reduced to a minimum. The mounting of the roll 101 in such a way that it actually floats between the driven roll 2 and the support (roll) 3 of FIG. 2 brings about the advantage that the diameter of the shaft or core for the small-diameter roll 101 can be reduced to a very small fraction of the diameter of the roll 101, i.e., that the thickness of the shell 5 (measured radially of the roll 101) suffices to enable this roll to expel and/or withdraw large quantites of moisture from the running web 34. It is presently preferred to select the dimensions of the larger roll 2 in such a way that the diameter of its external surface is up to 1.4 times the diameter of the core 28, and that the diameter of the external surface of the roll 101 is at least 1.4 times the diameter of the core 4.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for changing the moisture content of a running web of filamentary, fibrous or like material, comprising a first roll having an elongated core and a shell surrounding said core, said shell having a cylindrical external surface and comprising a stack of washer-like concentric discs of absorbent material, said roll further having two end walls flanking said shell and maintaining said discs in compressed condition, one of said end walls having a convex frustroconical surface abutting the respective end of said stack and the other of said end walls having a concave frustoconical surface abutting the respective end of said stack, each of said discs having a frustoconical shape and tapering toward said core in a direction toward said other end wall; and a second roll defining with said first roll a nip through which the running web passes.

2. The apparatus of claim 1, wherein said first roll further comprises at least one substantially funnel-shaped washer interposed between two discs of said stack and having an outer diameter smaller than the diameter of said external surface.

3. The apparatus of claim 2, wherein the thickness of said washer in the axial direction of said core decreases from said core toward said external surface.

4. The apparatus of claim 2, wherein said washer contains an elastomeric material.

5. The apparatus of claim 1, wherein at least one of said frustoconical surfaces is roughened.

6. The apparatus of claim 1, wherein said frustoconical surfaces and the axis of said core make an oblique angle which exceeds 90° and is less than 176°.

7. The apparatus of claim 1, wherein said core and said shell define a gap and further comprising a filler in said gap.

8. The apparatus of claim 1, wherein said core has an outer layer and at least such outer layer of said core consists of a corrosion-resistant material.

9. The apparatus of claim 1, wherein the hardness of said shell in the region of said external surface is less than 80° Shore A.

10. The apparatus of claim 9, wherein the hardness of said shell in the region of said external surface is between 40° and 70° Shore A.

11. The apparatus of claim 1, wherein the density of said discs in the region of said core is between 1.1 and 2 times the density of said discs in the region of said external surface.

12. The apparatus of claim 1, wherein the pressure during passage of the web through said nip at least approximates a predetermined value at which the density of said discs in the region of said nip increases to a given value, the density of each of said discs adjacent said core under the action of said end walls at least approaching said given value.

13. The apparatus of claim 1, wherein the absorbency of the material of said discs is such that, in undeformed condition thereof, each of said discs can absorb a quantity of liquid whose weight is at least twenty times the weight of the respective disc.

14. The apparatus of claim 13, wherein each of said discs consists of a fibrous material.

15. The apparatus of claim 1, wherein the density of said discs in the region of said external surface is less than 1 g/cm$^3$.

16. The apparatus of claim 15, wherein said density is between 0.3 and 0.6 g/cm$^3$.

17. The apparatus of claim 1, further comprising web tensioning means for maintaining the running web in contact with the external surface of said shell along an arc of at least 60° downstream of said nip.

18. The apparatus of claim 1, wherein said second roll comprises a second shell having a cylindrical external surface and comprising a stack of washer-like funnel-shaped discs.

19. The apparatus of claim 18, wherein the inclination of the discs of said first named shell relative to the axis of the respective core is at least substantially identical with the inclination of discs of said second shell relative to the axis of said second roll.

20. The apparatus of claim 18, wherein the inclination of discs of said first named roll relative to the axis of said first roll is opposite the inclination of discs of said second shell relative to the axis of said second roll.

21. The apparatus of claim 18, wherein the diameter of the external surface of the shell of one of said rolls approximates the diameter of the core of the other of said rolls.

22. The apparatus of claim 21, further comprising supporting means cooperating with said other roll to floatingly support said one roll in a position in which said rolls define said nip.

23. The apparatus of claim 22, wherein said supporting means includes a third roll abutting the external surface of said one roll.

24. The apparatus of claim 25, wherein the diameter of the external surface of the shell in said other roll is up to 1.4 times the diameter of the respective core and the diameter of the external surface of said second shell is at least 1.4 times the diameter of the respective core.

25. The apparatus of claim 1, wherein one of said end walls is fixed to said core and further comprising means for biasing the other of said end walls toward said one end wall.

26. Apparatus for changing the moisture content of a running web of filamentary, fibrous or like material, comprising a roll having an elongated core and a shell surrounding said core, said shell having a cylindrical external surface and comprising a stack of washer-like concentric discs of absorbent material, said roll further having two end walls flanking said shell and maintaining said discs in compressed condition, one of said end walls having a convex frustoconical surface abutting the respective end of said stack and the other of said end walls having a concave frustoconical surface abutting the respective end of said stack, at least one of said frustoconical surface being serrated and each of said discs having a frustoconical shape.

27. Apparatus for changing the moisture content of a running web of filamentary, fibrous or like material, comprising a roll having an elongated core and a shell surrounding said core, said shell having a cylindrical external surface and comprising a stack of washer-like concentric discs of absorbent material, said roll further having two end walls flanking said shell and maintaining said discs in compressed condition, one of said end walls having a convex frustoconical surface abutting the respective end of said stack and the other of said end walls having a concave frustoconical surface abutting the respective end of said stack, said convex frustoconical surface having at least one first ring-shaped tooth having a first annular flank nearer to and a second annular flank more distant from said core, said flanks defining an edge at the radially innermost end of said second flank, said concave frustoconical surface having at least one second ring-shaped tooth having a first flank nearer to and a second flask more distant from said core, the flanks of said second tooth defining an edge at the radially outermost end of the respective first flank, each of said discs having a frustoconical shape.

28. Apparatus for changing the moisture content of a running web of filamentary, fibrous or like material, comprising a roll having an elongated core and a shell surrounding said core, said shell having a cylindrical external surface and comprising a stack of washer-like concentric discs of absorbent material, said roll further having two end walls flanking said shell and maintaining said discs in compressed condition, one of said end walls having a convex frustoconical surface abutting the respective end of said stack and the other of said end walls having a concave frustoconical surface abutting the respective end of said stack, each of said discs having a frustoconical shape and said core and said shell defining a gap, said roll further comprising a filler in said gap and said filler containing a synthetic resin.

29. Apparatus for changing the moisture content of a running web of filamentary, fibrous or like material, comprising a first roll having an elongated core and a shell surrounding said core, said shell having a cylindrical external surface and comprising a stack of washer-like concentric discs of absorbent material, said roll further having two end walls flanking said shell and maintaining said discs in compressed condition, one of said end walls having a convex frustoconical surface abutting the respective end of said stack and the other of said end walls having a concave frustoconical surface abutting the respective end of said stack, each of said discs having a frustoconical shape; a second roll defining with said first roll a nip for the running web, said second roll comprising a second shell having a cylindrical external surface and comprising a stack of washer-like funnel-shaped discs, the density of discs forming said second shell in the region of the respective external surface being less than the density of discs of said first named shell in the region of the respective external surface; and means for draping the running web around a portion of the external surface of said second shell.

* * * * *